United States Patent
Kimura et al.

[19]

[11] Patent Number: 5,960,328
[45] Date of Patent: *Sep. 28, 1999

[54] FM RADIO RECEIVER AND SIGNAL PROCESSING DEVICE USED THEREIN

[75] Inventors: Kazuhiro Kimura, Fukaya; Shigeaki Hayashibe, Gunma-ken; Yutaka Hirakoso, Gyoda; Takahiko Masumoto; Shizuka Ishimura, both of Gunma-ken; Toshiyuki Ozawa, Ota; Munehiro Suka, Tokyo-to, all of Japan

[73] Assignee: Sanyo Electric Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/622,048

[22] Filed: Mar. 26, 1996

[30] Foreign Application Priority Data

Mar. 30, 1995 [JP] Japan ................................. 7-073816

[51] Int. Cl.$^6$ ...................................................... H04B 1/16
[52] U.S. Cl. .......................................... 455/45; 455/186.1
[58] Field of Search ............................. 455/181.1, 186.1, 455/186.2, 8, 9, 132–135, 45, 185.1

[56] References Cited

U.S. PATENT DOCUMENTS

| | | | |
|---|---|---|---|
| 4,234,956 | 11/1980 | Adderley et al. | 455/8 |
| 5,404,588 | 4/1995 | Henze | 455/186.1 |
| 5,666,660 | 9/1997 | Einsel et al. | 455/45 |

FOREIGN PATENT DOCUMENTS

0507096  10/1992  European Pat. Off. ............ 455/186.1

*Primary Examiner*—Nguyen Vo
*Attorney, Agent, or Firm*—Loeb & Loeb LLP

[57] ABSTRACT

Superimposed FM data is demodulated to digital data. A synchronism reproducing circuit (data block detecting section) detects the front of blocks in the digital data to generate a block head signal (a station change timing signal), which is supplied to a control section of a station selecting microcomputer. When a station selecting key requests a change of the received station, station data corresponding to a requested station is supplied to the control section (a station selecting control section). When the block head signal is inputted after requesting the change of the station, the control section begins to output station change data to a PLL frequency synthesizer in order to change the frequency signal in a front end. This prevents a latter part of a block in received superimposed FM data from being NG data.

24 Claims, 6 Drawing Sheets

FM RADIO RECEIVER AND SIGNAL PROCESSING DEVICE USED THEREIN

BACKGROUND OF THE INVENTION

1. Field of the Invention

The present invention relates to an FM radio receiver and a signal processing device used therein, and particularly to an FM radio receiver having a function of receiving a multiplex FM broadcast signal, on which data, such as character information, are superimposed.

2. Description of the Prior Art

Multiplex FM broadcasts, on which character information is superimposed, have recently begun to be transmitted. In this type of multiplex FM broadcasting, encoded character information is superimposed on stereo FM signals. The superimposed information includes news and traffic information at present. The broadcasting of figure information useful for an automobile navigation system is being investigated.

Figure 1:
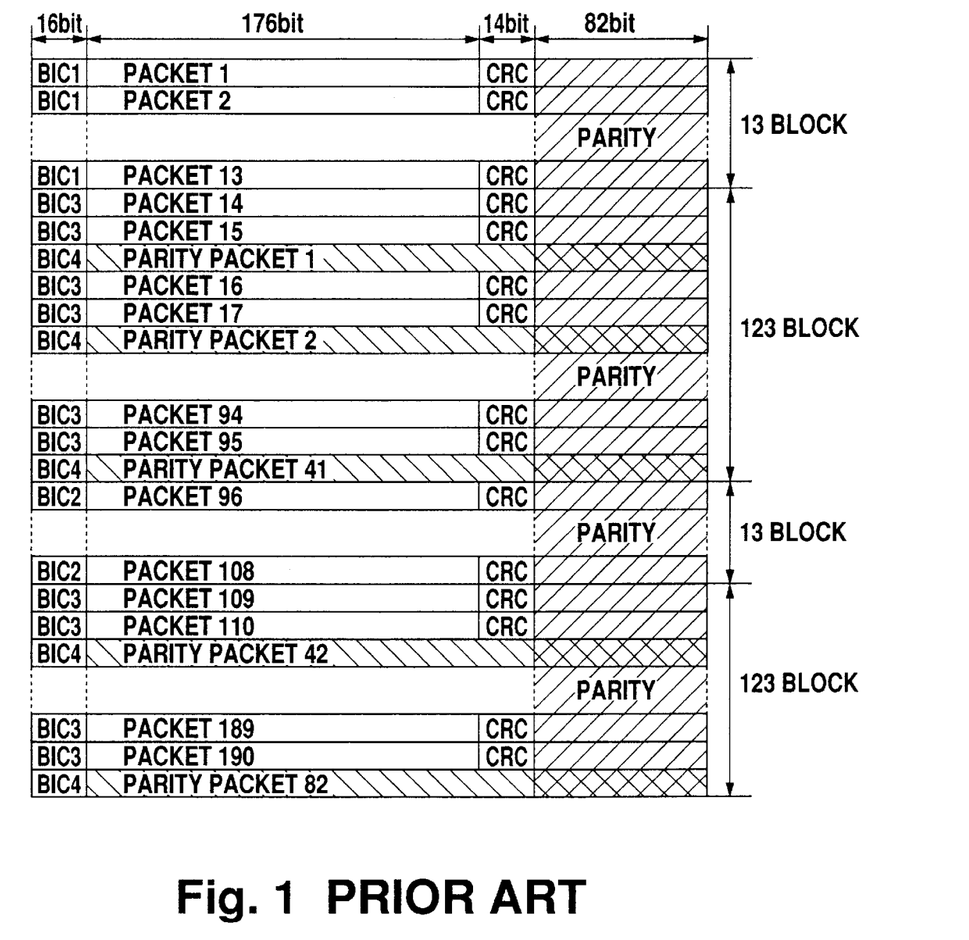
FIG. 1 represents the structure of a frame of a superimposed FM signal in multiplex FM broadcasting.

In the data radio channel (DARC) standard, multiplex FM data superimposed on a stereo FM signal have a frame structure composed of 288×272 bits, as shown in FIG. 1.

One line of the frame (one block) consists of a block identification block (BIC) composed of 16 bits, an error correcting code for correcting data errors which is composed of a cyclic redundancy code (CRC; 14 bits) and parity (82 bits), and a data packet composed of 176 bits.

Figure 2:
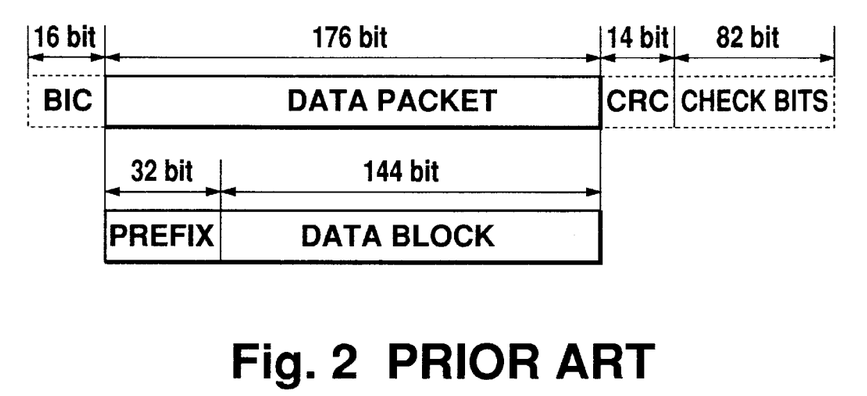
FIG. 2 represents the structure of the data packet of a block in the frame shown in FIG. 1.

The data packet in the block consists of a prefix composed of 32 bits and a data block composed of 144 bits, as shown in FIG. 2.

The respective superimposed FM data provided in multiplex FM broadcasting, such as character information, figure information and traffic information for an automobile navigation system, are assigned to one block of the transmitted frame. A service identification code is added to the prefix of the block so that it can be discerned what type of data among character information, figure information, traffic information for an automobile navigation system and so on, is superimposed on a received block.

In normal FM broadcasting, carrier waves are modulated by the main channel signal (L+R), pilot signal and sub channel signal (L−R). In multiplex FM broadcasting, a frequency band of the modulation signal for the superimposed FM data is set to be higher than that of the sub signal in normal FM broadcasting (centered at 76 kHz), in order not to interfere with the channel and pilot signals. Digital data obtained by level controlled minimum shift keying (LMSK) modulation in the higher frequency band is superimposed at a rate of 16 kbits/sec so that the block is transmitted for 18 msec, and accordingly, the frame is transmitted for 5 sec.

When receiving such multiplex FM broadcasts, a decoder for selecting and decoding the superimposed FM data, and a display for indicating character or figure information according to the provided service need to be added to a normal FM receiver.

Figure 3:
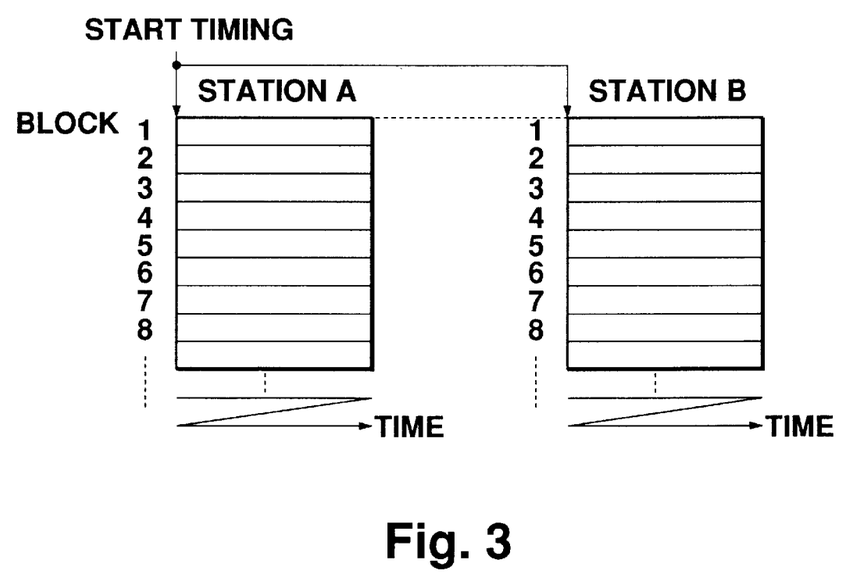
FIG. 3 represents superimposed FM data which are transmitted simultaneously from a plurality of broadcasting stations.

In the multiplex FM broadcasting, a plurality of broadcasting stations in one group probably transmit an identical program at the same time, like the stations A and B shown in FIG. 3. When the program is received by a receiver placed in a moving body, such as a vehicle, it is possible that the intensity of an electric field of the carrier waves from the broadcasting station A will become smaller, while the intensity of the electric field of the carrier waves from the station B will become large. If the FM transmissions of the superimposed FM data are synchronized between the stations A and B in the group, as shown in FIG. 3, the receiver placed in the moving body can continuously receive the superimposed FM data by changing the station from A to B.

When the station is changed from A to B, a user first operates a selecting key, as in a normal receiver. The tuned frequency (i.e. the frequency signal) is changed at the front end of a multiplex FM receiver in response to the user's key operation, enabling the receiver to tune to the station B.

When changing the broadcasting station, it is necessary to change the tuned frequency from that of station A to that of station B, to realize the receiving of a broadcast from station B. It takes a slightly longer time to enable tuning of a broadcast of station B. The broadcast cannot be caught during this time, and consequently the data superimposed on the broadcast at this time fail to be correctly received, causing an error (NG).

Figure 4A:
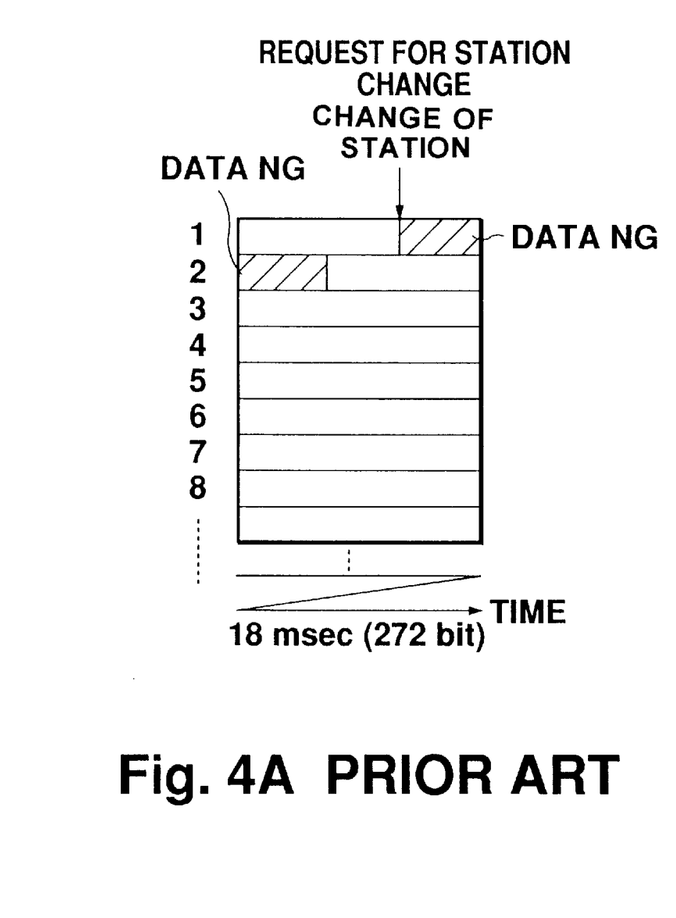
FIG. 4A represents an NG period of data received by a conventional FM receiver.

The change in frequency signal is performed in response to a request to change the station through the operation of a selecting key at an arbitrary time, as described above. Therefore, even if the NG period for the data is 18 msec or less, as shown in FIG. 4A, the change in frequency signal can interrupt data of one block length, causing NG for data of two blocks.

When NG occurs for data of a plurality of blocks, it is difficult to correctly decode data superimposed on the frame. This leads to a problem that the previously received data becomes useless. Therefore, the reduction of useless data has been required.

SUMMARY OF THE INVENTION

In order to solve the above problem, the present invention provides an FM radio receiver enabling change in frequency signal of a broadcasting station at an appropriate timing, and a signal processing device used in the FM radio receiver.

An FM radio receiver for receiving a multiplex FM broadcast on which data are superimposed, as provided by the present invention, comprises a station selecting section for generating a frequency signal of a requested broadcasting station, a timing signal generating section for detecting a predetermined data position of superimposed FM data included in a multiplex FM broadcast being received and generating a station change timing signal based on the data position, a station selecting control section for permitting the frequency signal in the station selecting section to change according to a station change request signal requesting a change of the broadcasting station which is supplied from a station change directing section, and a station change timing signal.

The station selecting section generates a frequency signal based on a station data signal corresponding to the requested broadcasting station, and the station selecting section supplies to the station selecting section the station data signal created based on the station change request signal in response to the generation of the station change timing signal.

In the FM radio receiver provided by the present invention, when a predetermined data position of superimposed FM data included in a multiplex FM broadcast is detected, the station change timing signal is generated. The timing of the change in received frequency is controlled based on the station change timing signal. Therefore, the change in received frequency can be prohibited until the data receiving reaches a predetermined data position of superimposed FM data, for example the front of a block, whenever the change of station is requested.

More specifically, the station selecting control section has a plurality of flip-flop circuits. The station data signal is supplied to the data terminal of the respective flip-flop circuits, and the station change timing signal is supplied to their clock terminals. The flip-flop circuit outputs the station selecting signal to the station selecting section in response to the supply of the two signals.

A signal processing device provided by the present invention, which is used in an FM radio receiver for demodulating data superimposed on a received FM signal of a selected broadcasting station, comprises a timing signal generating section for detecting a predetermined data position of demodulated superimposed FM data, and generating a station change timing signal controlling the change in received frequency of carrier waves from a broadcasting station, based on the detected predetermined data position.

The timing signal generating section for detecting the predetermined data position of superimposed FM data enables easy control of the timing for the change in received frequency of carrier waves from the broadcasting station.

The timing signal generating section detects a block identification code included in superimposed FM data, and generates the station change timing signal using the block identification code. Since the block identification code is always located at the front of each block in the superimposed FM data, the change of a multiplex FM broadcasting system is not needed. The station change timing signal can be generated at the predetermined position of the superimposed FM data using the block identification code.

In addition, the timing signal generating section detects the front of a block or an error correcting code of the superimposed FM data based on the block identification code, and generates the station change timing signal in response to the detection of the front of a block or error correcting code.

The generation of the station change timing signal based on the detection of the front of a block or the error correcting code using the block identification code, prevents the frequency signal from changing at an undesirable time during the block. The time during which data cannot be received can be limited to a part of the period for the front of each block and a part of the period for receiving the error correcting code.

Figure 4B:
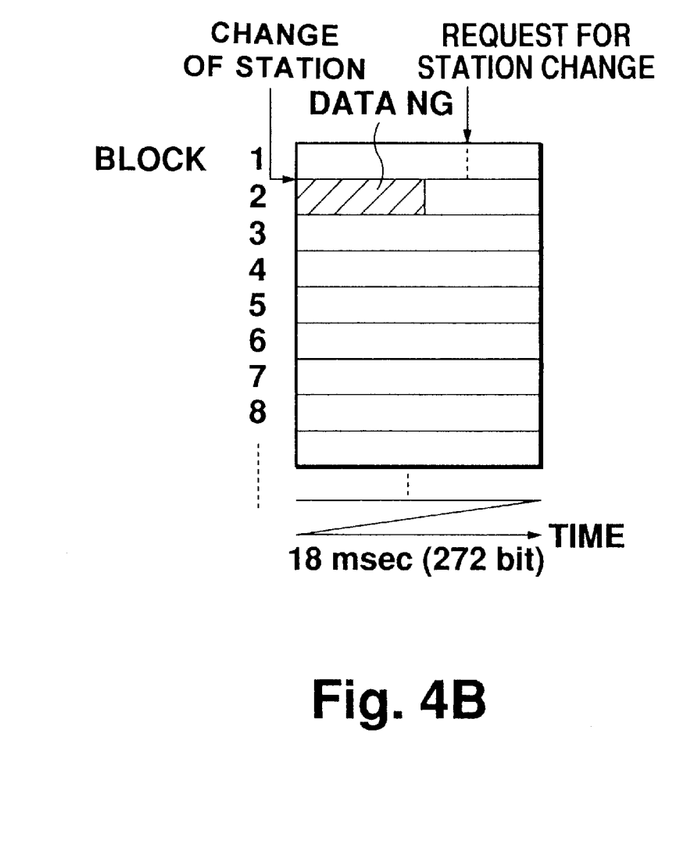
FIG. 4B represents an NG period of data received by an FM receiver provided by the present invention.

As shown in FIG. 4B, when the frequency signal is changed at the front of a block of superimposed FM data after the detection of the front, a prohibiting period for the receiving of a broadcast from another station (NG period) begins at the front of a block. This facilitates limiting the NG period arising from the change of the broadcasting station to a certain time within the block. When the NG period is limited to the length of the block, it prevents the NG period from enlarging to a period of two or more blocks, making it possible to reduce loss of the previously received data.

DESCRIPTION OF THE PREFERRED EMBODIMENT

A preferred embodiment of the present invention will be described below with reference to drawings.

Figure 5:
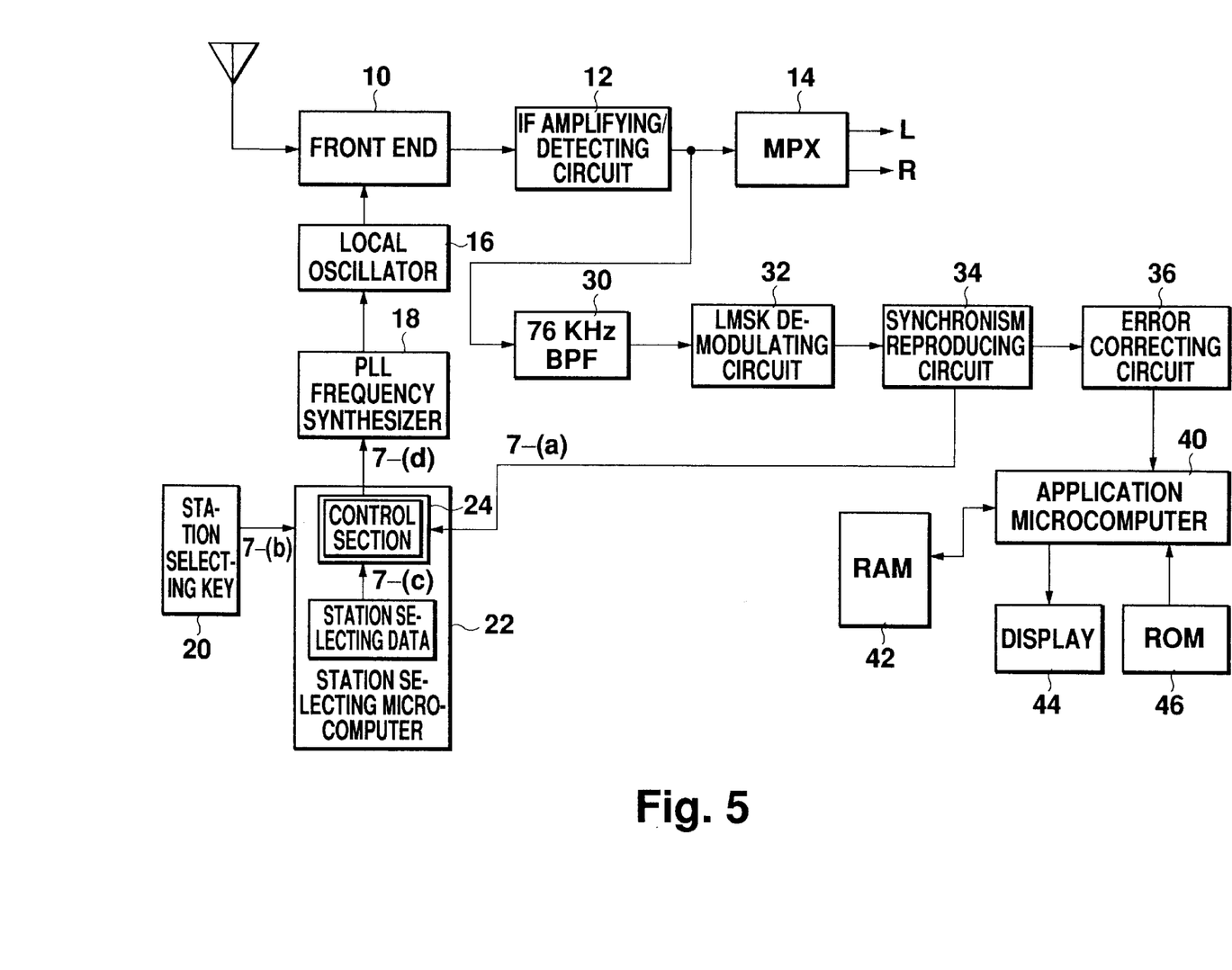
FIG. 5 represents a simplified structure of the main section of an FM receiver according to the preferred embodiment of the present invention.

The main structure of an FM receiver according to a preferred embodiment of the present invention is shown in FIG. 5.

Carrier waves (radio frequency signals) received by an antenna are supplied to a front end 10. The front end 10 mixes the received carrier waves from the antenna with a signal which is supplied from a local oscillator 16, and has a predetermined frequency corresponding to a requested broadcasting station. A frequency signal for the requested station, which is converted to an intermediate frequency (IF=10.7 MHz), is extracted.

The extracted signal for the requested station is amplified and detected in an IF amplifying/detecting circuit 12. A detected signal whose voltage level varies corresponding to the frequency for the requested station is outputted from the IF amplifying/detecting circuit 12.

The detected signal from the IF amplifying/detecting circuit 12 is supplied to an MPX 14. A normal stereo signal is stereophonically demodulated in the MPX 14. L and R signals are supplied to speakers to reproduce sounds.

In this embodiment, a band-pass filter (BPF) 30 passing waves having a frequency of 76 kHz, which is equal to the frequency of carrier waves for superimposed FM data, and a decoder for decoding superimposed FM data extracted in the BPF 30 are successively connected to the output terminal of the IF amplifying/detecting circuit 12. The decoded data is shown on a display 44. The decoder for the superimposed FM data comprises an LMSK demodulating circuit 32, synchronism reproducing circuit 34 and error correcting circuit 36.

When the detected signal from the IF amplifying/detecting circuit 12 is supplied to the BPF 30, the BPF 30 extracts a signal having a frequency band of 76 kHz. FM data superimposed on the detected signal are extracted by LMSK modulation. The extracted LMSK signal is supplied to the LMSK modulating circuit 32, and then demodulated to digital data in the form of "1" or "0".

The synchronism reproducing circuit 34 detects a block identification code (BIC) in the demodulated digital data. The frame synchronization and block synchronization are achieved based on the BIC, and then the frame structure of the superimposed data, as shown in FIG. 1, is reproduced.

The synchronism reproducing circuit 34 generates a block starting signal (station change timing signal), described later, in response to the detection of BIC, and supplies the block starting signal to a station selecting section 24 of a station selecting microcomputer 22.

The digital data reproduced in the synchronism reproducing circuit 34 are outputted to the error correcting circuit 36. The error correcting circuit 36 corrects errors included in the data packet (composed of 176 bits) of the reproduced digital data using a CRC and parity located successively to the data packet, and also corrects errors in the vertical direction using parity packets located in the frame. When the number of error bits within the block, or when the number of error bits at a corresponding position of the data packets in the vertical direction is 11 or less, the error correcting circuit 36 can correct the error.

The digital data after the error correction are sequentially stored in a RAM 42 under the control of an application microcomputer 40, and shown in the display 44 such as a liquid crystal display. A ROM 46 is a chinese character ROM, which is referred to when the superimposed data is character information.

A requested broadcasting station is selected by the operation of a station selecting key 20 by a user. The station selecting microcomputer 22 supplies station data corresponding to the requested station to a PLL frequency synthesizer 18 in response to an output signal from the station selecting key. The PLL frequency synthesizer 18 operates in response to the supplied station data, and then changes the frequency of a signal outputted from the local oscillator 16 to the front end 10. The frequency is shifted by 10.7 MHz from that for the requested station. A signal for the requested station is extracted in the front end 10, and then outputted to the IF amplifying/detecting circuit 12 connected to the output terminal of the front end 10.

The operation of an FM receiver according to the preferred embodiment of the present invention in changing the broadcasting station will be described with reference to FIGS. 5, 6 and 7.

Figure 6:
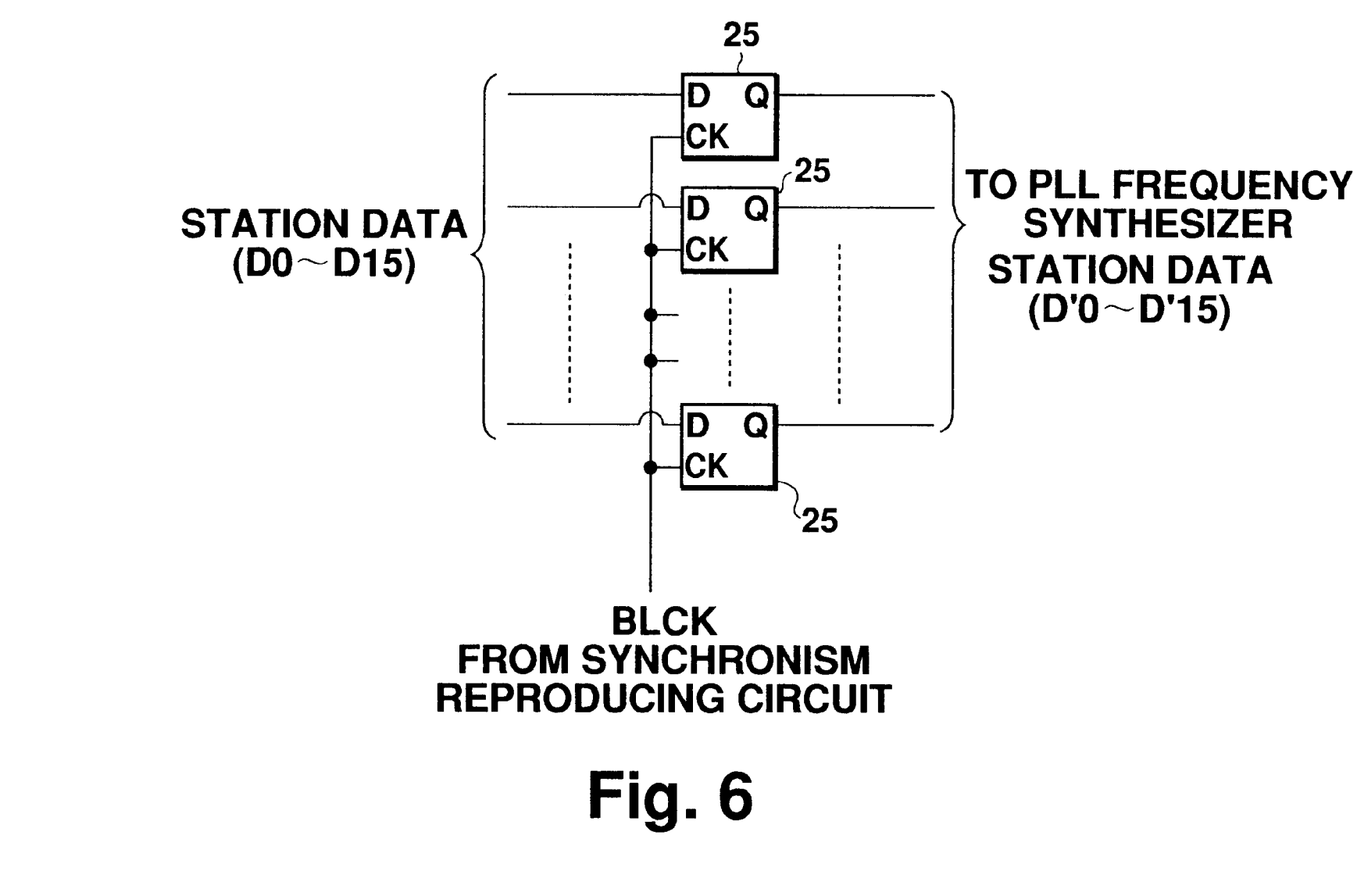
FIG. 6 shows the control section of the main section shown in FIG. 5.

In the control section (the station selection control section) 24 of the station selecting microcomputer 22 shown in FIG. 5, a plurality of flip-flop circuits 25 are arranged in parallel, as shown in FIG. 6.

When the station is changed from the station A to B, a user operates the station selecting key 20 shown in FIG. 5 to select the station B. A station change requesting signal and station selecting signal for the station B are supplied together to the station selecting microcomputer 22 (see FIG. 7 (*b*)). The station selecting microcomputer 22 creates predetermined station data (D0–D15) corresponding to the frequency of carrier waves from the station B at the rising edge of the station change requesting signal. The created station data are supplied to the D terminal of the flip-flop circuit 25 in the station selection control section 24 shown in FIG. 6 (see FIG. 7 (*c*)).

The synchronism reproducing circuit 34 detects the front of a block using the BIC put at the front of the blocks included in the received superimposed FM data, and generates block head signals (BLCK) arising at intervals of 18 msec. The block head signals (BLCK) are supplied to the CK terminal of the respective flip-flop circuits 25 as the station change timing signal.

Figure 7:
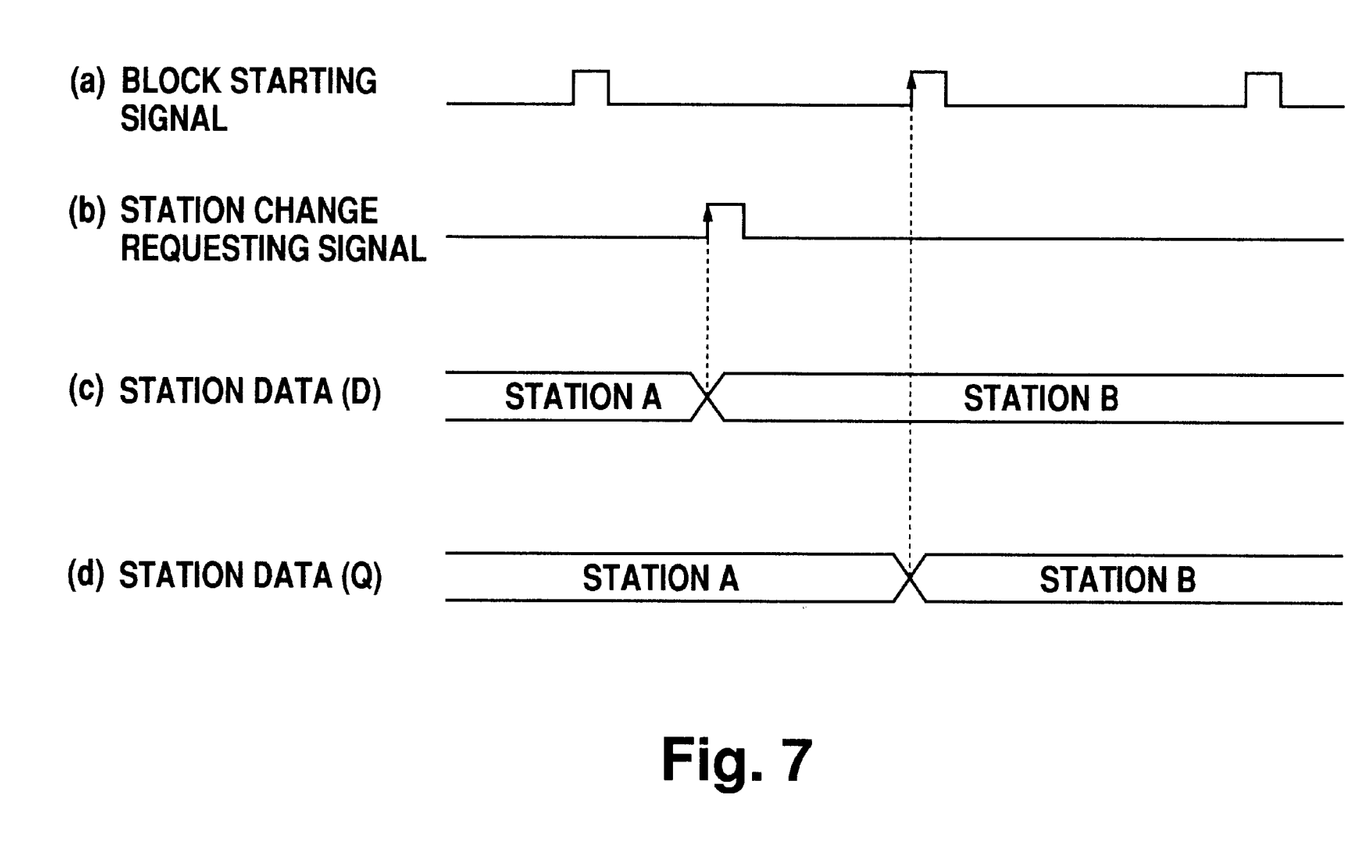
FIG. 7 shows the waveform of a signal representing the operation of an FM receiver according to the preferred embodiment of the present invention when changing the received broadcasting station.

The respective flip-flop circuits 25 shown in FIG. 6 outputs station data (D'0–D'15) corresponding to the received frequency of carrier waves from the station B, from the Q terminal, when the station data (D0–D15) corresponding to the station selecting signal is supplied to the D terminal of the flip-flop circuit 25 and the block head signal arises, which means that a timing signal for changing the frequency signal in the front end 10 occurs (see FIG. 7 (*d*)).

The station data (D'0–D'15) are outputted to the PLL frequency synthesizer 18 shown in FIG. 5. The frequency synthesizer 18 changes the frequency of a signal outputted from the local oscillator 16 based on the station data (D'0–D'15).

This causes the frequency of the signal outputted from the local oscillator 16 to shift by 10.7 MHz from the frequency of station B. The frequency of the requested station (station B) is extracted in the front end 10, and then the receiving of a multiplex FM broadcast from the station B is started.

In this preferred embodiment, the change in frequency signal of a requested station in the front end is prohibited until the front of the block of the superimposed FM data is detected, even if the change of the station is requested. Part of a block of superimposed data becoming NG shown in FIG. 4A is prevented. The NG period in this preferred embodiment is the time spent from the front of the block to a point at which the broadcast from another station can be received, as shown in FIG. 4B.

When the NG period initiated at the change in received frequency is 18 msec or less, it prevents data included in a plurality of blocks from being NG.

The station is not always changed at the timing of the front of a block as shown in this preferred embodiment. For example, the frequency signal can be changed in the receiving period of the CRC or parity shown in FIG. 1. When this error correcting code becomes NG, the error correcting rate for a data packet becomes smaller, but the NG period of the data packet arising from the change of the receiving station can be reduced. The BIC located at the front of the block first needs to be detected when the CRC or parity of the block is found. Using the detected BIC, the CRC beginning at the 193rd bit of the front of the block (the first bit), or the parity beginning at the 234th bit, can be found. When the 193rd or later bit, or the 234th or later bit is detected, the station change timing signal is supplied to the clock terminal CK of the flip-flop circuit 25 shown in FIG. 6.

As shown in FIG. 1, the frame of the superimposed FM data has 82 parity packets for performing the error correction in the vertical direction. It can be determined using the block identification code what kind of block is received in the superimposed FM data. Therefore, when the change of the station is requested in the receiving period of the parity packet for the error correction in the vertical direction or of data existing near the parity packet in the data packet, the change in frequency signal can be carried out in the receiving period of the parity packet for the error correction in the vertical direction.

When certain blocks cannot be reproduced due to NG data packets, the blocks are not shown in the display 44. Furthermore, the frame including the blocks is displayed with an indication of data deficiency of the blocks. This makes it possible to reduce the amount of useless data in the superimposed FM data received when changing the received station.

While there has been described what is at present considered to be a preferred embodiment of the present invention, it will be understood that various modifications may be made thereto, and it is intended that the appended claims cover all such modifications as fall within the true spirit and scope of the present invention.

What is claimed is:

1. An FM radio receiver for receiving a multiplex FM broadcast on which data are superimposed, the FM radio receiver comprising:

a station selecting section that selects a frequency signal of a requested broadcasting station from a received signal and demodulates FM multiplex data having a plurality of blocks, each block containing a code in a first predetermined location of the block for determining one of beginning and ending location of the block;

a timing signal generating section which is connected to the station selection section and generates a station change timing signal to change from a present broadcasting station to the requested broadcasting station; and a station selecting control section that detects the station change timing signal and changes from the present station to the requested station when a second predetermined location of the block is detected after receiving the station change timing signal, wherein an amount of NG blocks of FM multiplex data caused during the switching from the present broadcasting station to the requested broadcasting station is minimized.

2. An FM radio receiver in accordance with claim 1, wherein the station selecting section generates a frequency signal based on a station data signal corresponding to the requested broadcasting station, and the station selecting control section supplies to the station selecting section the station data signal which is created based on the station change request signal, in response to the generation of the station change timing signal.

3. An FM radio receiver in accordance with claim 1, wherein the timing signal generating section detects a block identification code in the superimposed FM data, and generates the station change timing signal using the detected block identification code.

4. An FM radio receiver in accordance with claim 3, wherein the timing signal generating section detects the front of a block in the superimposed FM data using the block identification code, and generates the station change timing signal in response to the detection of the front of the block.

5. An FM radio receiver in accordance with claim 4, wherein the timing signal generating section detects the front of an error correcting code in the superimposed FM data using the block identification code, and generates the station change timing signal in response to the detection of the front of the error correcting code.

6. An FM radio receiver according to claim 1, wherein the FM multiplex data are constituted by a frame in which a plurality of blocks are arranged, each of the plurality of blocks including a block identification code, an error correction code, and a parity bit, wherein the timing signal generating section generates the station change timing signal in synchronism with a head of either the block identification code, the error correction code, or the parity bit, and wherein by using the station change timing signal, the station selecting control section permits the changeover of FM stations at the head of the block, after the station change request signal for switching to a different FM station is generated between two station change timing signals.

7. An FM radio receiver for receiving a multiplex FM broadcast on which data are superimposed, the FM radio receiver comprising:

a station selecting section for selecting a frequency signal of a requested broadcasting station from a received signal;

a timing signal generating section for detecting a predetermined data position of superimposed FM data included in the multiplex FM broadcast being received and generating a station change timing signal based on the predetermined data position; and a station selecting control section for permitting the frequency signal in the station selecting section to change from a current broadcasting station to the requested broadcasting station, which is synchronized with the current broadcasting station, according to a station change request signal requesting a change of the broadcasting station and the station change timing signal when the predetermined data position is detected, wherein the station selecting section generates a frequency signal based on a station data signal corresponding to the requested broadcasting station, and the station selecting control section supplies to the station selecting section the station data signal which is created based on the station change request signal, in response to the generation of the station change timing signal, and wherein the station selecting control section has a plurality of flip-flop circuits, the respective flip-flop circuits outputting the station data to the station selecting section when the station data signal is supplied to the data terminal of the respective flip-flop circuits, and the station change timing signal is supplied to the clock terminal of the respective flip-flop circuits from the timing signal generating section.

8. A signal processing device used in an FM radio receiver for demodulating a superimposed multiplex FM signal of a selected broadcasting station, the superimposed multiplex FM signal having a plurality of blocks, the signal processing device comprising:

a timing signal generating section for detecting a code located in a predetermined position of each block of the plurality of blocks and generating a station change timing signal controlling the change in a frequency signal of a current broadcasting station to the selected broadcasting station, a station selecting control section that detects the station change timing signal and changes from the current broadcasting station to the selected broadcasting station when a second predetermined location of the block is detected after receiving the station change timing signal, wherein an amount of NG blocks of FM multiplex data caused during the switching from the present station to the requested station is minimized.

9. A signal processing device in accordance with claim 7, wherein the timing signal generating section detects a block identification code in the superimposed FM data, and generates the station change timing signal using the detected block identification code.

10. A signal processing device in accordance with claim 8, wherein the timing signal generating section detects the front of a block in the superimposed FM data using the block identification code, and generates the station change timing signal in response to the detection of the front of the block.

11. A signal processing device in accordance with claim 8, wherein the timing signal generating section detects the front of an error correcting code in the superimposed FM data using the block identification code, and generates the station change timing signal in response to the detection of the front of the error correcting code.

12. An FM radio receiver for receiving a multiplex FM broadcast on which FM multiplex data are superimposed, the FM radio receiver comprising:

a station selecting section for selecting a second FM station from a first FM station and demodulating FM multiplex data, in which each frame of the FM multiplex data having a plurality of blocks each block having a code at a predetermined location thereof for executing predetermined processing;

a timing signal generating section for generating a station change timing signal in response to the code located in each block; and a station selection control section that detects, when a station change instruction for switching from the first FM station to the second FM station, both having synchronously superimposed FM multiplex data, is generated between two successive station change timing signals, the code immediately after generation of the station change instruction and switches from the first FM station to the second FM station in response to the station change timing signal, wherein an amount of NG blocks of FM multiplex data caused during the switching from the first FM station to the second FM station is minimized.

13. An FM radio receiver in accordance with claim 11, wherein the station selecting section generates a frequency signal based on a station data signal corresponding to the different broadcasting station and a station change request signal, and the station selecting control section supplies to the station selecting section the station data signal which is created based on the station change request signal, in response to the generation of the station change timing signal.

14. An FM radio receiver according to claim 12, wherein the FM multiplex data are constituted by a frame in which a plurality of blocks are arranged, each of the plurality of blocks at least including an error correction code or a parity bit, wherein the timing signal generating section generates the station change timing signal by synchronizing with a predetermined position of either the error correction code or the parity bit, and wherein by using the station change timing signal, the station selection control section permits the changeover of FM stations at the predetermined position of the error correction code or the parity bit, after the station change instruction for switching to a different FM station is generated between the two station change timing signals.

15. An FM radio receiver according to claim 12, wherein the FM multiplex data superimposed on an FM signal from an FM station are unchanged before and after the changeover of FM stations.

16. An FM radio receiver according to claim 15, wherein the FM multiplex data are constituted by a frame in which a plurality of blocks are arranged, each of the plurality of blocks including a block identification code, an error correction code, and a parity bit, wherein the timing signal generating section generates the station change timing signal in synchronism with a head of either the block identification code, the error correction code, or the parity bit, and wherein by using the station change timing signal, the station selection control section permits the changeover of FM stations at the head of the block, after the station change instruction for switching to a different FM station is generated between the two station change timing signals.

17. An FM radio receiver according to claim 15, wherein the FM multiplex data are constituted by a frame in which a plurality of blocks are arranged, each of the plurality of blocks at least including an error correction code or a parity bit, wherein the timing signal generating section generates the station change timing signal in synchronism with a predetermined position of either the error correction code or the parity bit, and by using the station change timing signal, the station selecting control section permits the changeover of FM stations at the predetermined position of the error correction code or the parity bit, after the station change instruction for switching to a different FM station is generated between the two station change timing signals.

18. An FM radio receiver for receiving a multiplex FM broadcast on which FM multiplex data are superimposed, the FM radio receiver comprising:

a station selecting section for selecting a demanded FM station;

a timing signal generating section for generating a station change timing signal in synchronism with a predetermined data position of demodulated FM multiplex data; and a station selection control section for permitting the changeover of synchronized FM stations in synchronism with the station change timing signal after a station change instruction for switching to a different FM station is generated between two station change timing signals, wherein the station selecting section generates a frequency signal based on a station data signal corresponding to the different broadcasting station, and the station selecting control section supplies to the station selecting section the station data signal which is created based on a station change request signal, in response to the generation of the station change timing signal wherein the station selecting control section has a plurality of flip-flop circuits, the respective flip-flop circuits outputting the station data to the station selecting section when the station data signal is supplied to the data terminal of the respective flip-flop circuits, and the station change timing signal is supplied to the clock terminal of the respective flip-flop circuits from the timing signal generating section.

19. A signal processing device used in an FM radio receiver for selecting a predetermined FM station, for receiving an FM signal transmitted from the selected FM station, and for demodulating FM multiplex data superimposed on an FM signal, in which each frame of the FM multiplex data having a plurality of blocks each having a code at a predetermined location thereof for executing predetermined processing, the signal processing device comprising:

a timing signal generating section for generating a station change timing signal at an end of the code included in each block, and for detecting, when a station change instruction for switching from a first FM station to a second FM station, both having synchronously superimposed FM multiplex data, is generated between two successive station change timing signals, the code immediately after generation of the station change instruction and switches from the first FM station to the second FM station in response to the station change timing signal, wherein an amount of NG blocks of FM multiplex data caused during the switching from the first FM station to the second FM station is minimized.

20. A signal processing device used in an FM radio receiver according to claim 19, wherein the each block includes a block identification code, an error correction code, and a parity bit, and the timing signal generating section which generates the station change timing signal in synchronism with a head of either the block identification code, the error correction code, or the parity bit to change the FM station at the head of the block by using the station change timing signal, after the station change instruction for switching to a different FM station is generated between the two station change timing signals.

21. A signal processing device used in an FM radio receiver according to claim 19, wherein the each block includes at least an error correction code or a parity bit, and wherein the timing signal generating section generates the station change timing signal in synchronism with a predetermined position of either the error correction code or the parity bit to change the FM station at the predetermined position of the error correction code or the parity bit, after the station change instruction for switching to a different FM station is generated between the two station change timing signals.

22. A signal processing device used in an FM radio receiver according to claim 19, wherein the FM multiplex data superimposed on the FM signal from the FM station are unchanged before and after the changeover of FM stations.

23. A signal processing device used in an FM radio receiver according to claim 22, wherein the each block includes a block identification code, an error correction code, and a parity bit, and wherein the timing signal generating section generates the station change timing signal in synchronism with a head of either the block identification code, the error correction code or the parity bit to change the FM station at the head of the block by using the station change timing signal, after the station change instruction for switching to a different FM station is generated between the two station change timing signals.

24. A signal processing device used in an FM radio receiver according to claim 22, wherein the each block includes at least an error correction code or a parity bit, and wherein the timing signal generating section generates the station change timing signal in synchronism with a predetermined position of either the error correction code or the parity bit to change the FM station at the predetermined position of the error correction code or the parity bit, after the station change instruction for switching to a different FM station is generated between the two station change timing signals.

* * * * *